Figure 1:
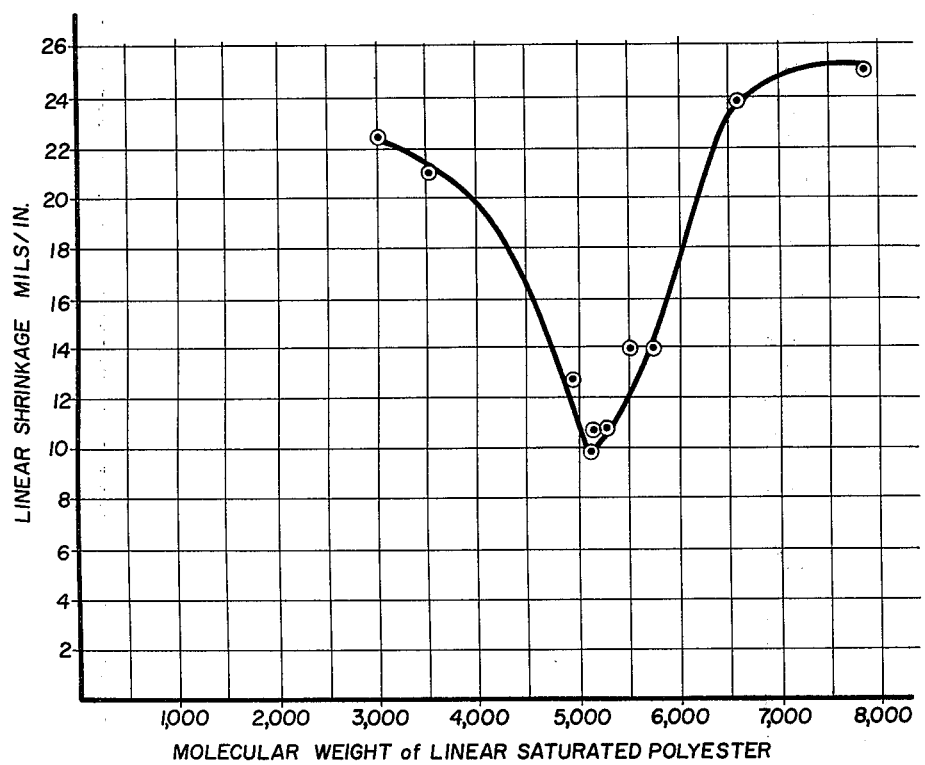

United States Patent [19]
Dombroski et al.

[11] 3,929,868
[45] Dec. 30, 1975

[54] SATURATED POLYESTER USEFUL AS LOW SHRINK ADDITIVE FOR MOLDING COMPOSITIONS CONTAINING UNSATURATED POLYESTERS

[75] Inventors: John R. Dombroski; John R. Caldwell, both of Kingsport, Tenn.

[73] Assignee: Eastman Kodak Company, Rochester, N.Y.

[22] Filed: July 11, 1974

[21] Appl. No.: 487,691

Related U.S. Application Data

[63] Continuation-in-part of Ser. No. 388,705, Aug. 15, 1973, abandoned.

[52] U.S. Cl. ............................ 260/475 P; 260/75 R
[51] Int. Cl.² ......................................... C08G 63/20
[58] Field of Search ...................... 260/75 R, 475 P

[56]        References Cited
UNITED STATES PATENTS

| | | | |
|---|---|---|---|
| 2,856,378 | 10/1958 | Lundberg | 260/31.6 |
| 3,390,132 | 6/1968 | Walker | 260/75 |
| 3,391,056 | 7/1968 | Robinson | 161/232 |
| 3,489,707 | 1/1970 | Fry | 260/31.6 |
| 3,553,284 | 1/1971 | Riemhofer et al. | 260/850 |
| 3,642,683 | 2/1972 | Fry | 260/31.6 |
| 3,736,278 | 5/1973 | Wada | 260/22 CB |

Primary Examiner—Donald E. Czaja
Assistant Examiner—Earl A. Nielsen

[57]          ABSTRACT

Disclosed are linear saturated polyesters that can be added to unsaturated polyester resins to prepare a molding composition that exhibits an unobviously low shrinkage upon curing. The linear saturated polyesters are prepared from terephthalic acid, isophthalic acid, 1,4-cyclohexanedicarboxylic acid, diethylene glycol and benzenetricarboxylic acid.

2 Claims, 1 Drawing Figure

SATURATED POLYESTER USEFUL AS LOW SHRINK ADDITIVE FOR MOLDING COMPOSITIONS CONTAINING UNSATURATED POLYESTERS

This application is a continuation-in-part of our copending application Ser. No. 388,705, filed Aug. 15, 1973, now abandoned.

This invention relates to specific linear saturated polyesters that can be added to unsaturated polyester resins to prepare molding compositions that exhibit unobviously low shrinkage during curing.

Unsaturated polyester molding compositions are widely used today. These compositions, when cured under heat and pressure, produce rigid thermoset products which have found broad application in the manufacture of automotive parts, boats, appliance parts, furniture, etc. Although nonfiber glass reinforced unsaturated polyester molding compositions produce molded articles that have an acceptable surface finish, the use of fiber glass reinforced unsaturated polyester molding compositions in applications requiring excellent finished appearance has been restricted because of the inherently poor surface quality of molded parts. The unacceptable surface characteristics of fiber glass reinforced moldings often necessitate costly prepaint operations, such as sanding and abrading, in order to obtain acceptably smooth painted products.

The unacceptable surface character is thought to result from shrinkage which occurs in the unsaturated polyester-monomer crosslinking reaction. According to one theory, the areas between the glass fibers at the surface take the form of depressions because of the contraction of the resin during curing. As is well known in the art, a typical unsaturated polyester resin shrinks about 8–10% by volume as it cures. In molding articles of typical sizes, this can result in an overall linear part shrinkage of from 1–4 mils/in.

Techniques for decreasing the shrinkage of unsaturated polyester resins upon curing are reported in U.S. Pat. Nos. 3,642,672, 3,549,586 and Netherlands 67/10031. These techniques involve adding to the unsaturated polyester resin a high molecular weight thermoplastic polymer, such as homopolymers of various acrylates, methacrylates, styrene and vinyl acetate, copolymers of styrene, copolymers of vinyl chloride and vinyl acetate, cellulose acetate butyrate, cellulose acetate propionate and others.

Other prior art that applicants are aware of is U.S. Pat. Nos. 2,642,403, 3,489,707, 3,549,586, 3,642,683, 3,668,178, 3,701,748, 2,856,378, 3,642,672, 3,736,278, 3,607,530, Belgium 741,777 and Belgium 727,415.

U.S. Pat. No. 2,856,378 is distinguishable from this invention because this reference does not disclose the alicyclic dicarboxylic acid used in the saturated linear polyester.

U.S. Pat. No. 3,736,278 is distinguished from this invention because this reference discloses only polyesters of neopentyl glycol and propylene glycol.

U.S. Pat. Nos. 3,549,586 and 3,668,178 are distinguishable from this invention because these references disclose only polyesters of hydroxyacids, such as α-hydroxy caproic acid.

We have now invented specific linear saturated polyesters that can be added to glass filled unsaturated polyester resins to prepare molding compositions that exhibit unobviously low shrinkage upon curing and consequently exhibit exceptionally high surface smoothness.

The linear saturated polyesters of this invention can be described as polyesters consisting essentially of the following structure

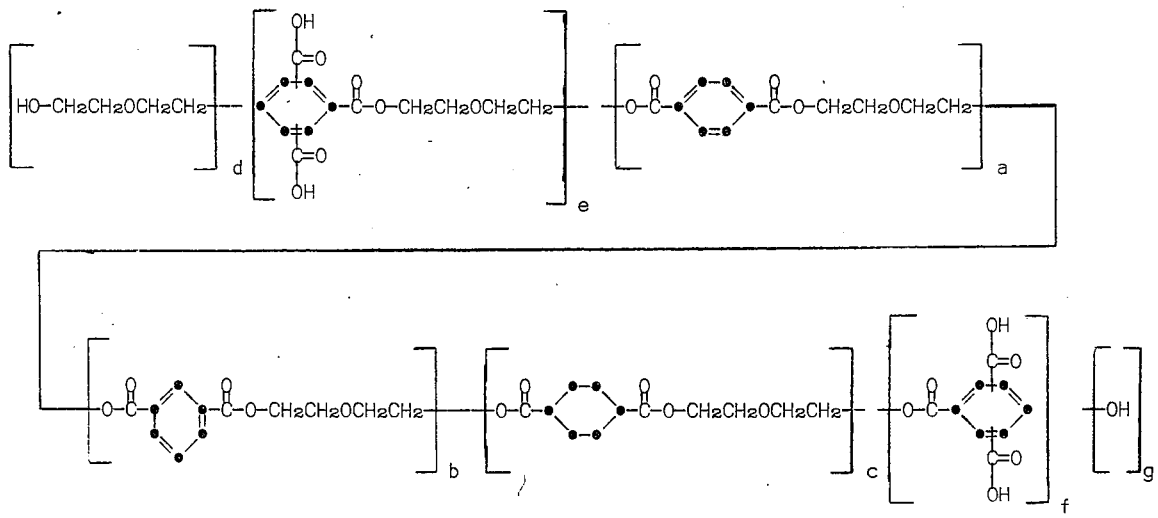

wherein
based on the sum of $a$, $b$ and $c$ being 100 moles, $a$ is from 44 to 47 moles, $b$ is from 44 to 47 moles and $c$ is from 6 to 12 moles,
$d$ is 0 or 1, $e$ is 0 or 1 and the sum of $d$ and $e = 1$,
$f$ is 0 or 1, $g$ is 0 or 1 and the sum of $f$ and $g = 1$,
$e$ or $f$ are at least 1, the molecular weight of the polyester is 4000 to 6000, and
the acid number of the polyester is 10 to 30.

The low shrink molding composition obtained by adding the linear saturated polyesters to an unsaturated polyester resin can be described as a curable composition comprised of an admixture of A. an unsaturated polyester,
B. a monomer having at least one olefinic group copolymerizable with the unsaturated polyester, and
C. from 8 to 16 weight percent, based on the weight of the composition, of the linear saturated polyester.

As can be readily understood from examining the above structure, the linear saturated polyesters are prepared from terephthalic acid, isophthalic acid, 1,4- cyclohexanedicarboxylic acid, diethylene glycol and benzenetricarboxylic acid or the corresponding acid anhydrides. The benzenetricarboxylic acid can be either the 1,2,4-isomer, sometimes called trimellitic acid or the 1,3,5-isomer, sometimes called trimesic acid or the anhydrides of these acids.

The linear saturated polyester can be prepared by a process comprised of two steps.

The first step in the process for preparing the linear saturated polyesters is preparation of a hydroxy terminated polyester from terephthalic acid, isophthalic acid, 1,4-cyclohexanedicarboxylic acid and diethylene glycol. These hydroxy terminated polyesters can readily be prepared by those skilled in the art by determining the amount of the various materials needed to achieve the above-described quantity of moles in the structure and then forming the hydroxy terminated polyester according to techniques well known in the art, such as ester interchange, direct esterification as acidolysis. The molecular weight must be controlled so as to achieve a molecular weight of 4000 to 6000 in the final linear saturated polyester.

The second step in the process for preparing the linear saturated polyester is to carboxylate the ends of the hydroxy terminated polyester with sufficient benzenetricarboxylic acid to achieve an acid number of 10 to 30. Thus, only a portion of the hydroxy ends will be reacted with the benzene tricarboxylic acid.

In this invention, the molecular weight of the linear saturated polyesters are critical. In general, if the molecular weight is either too high or too low the molding composition containing the linear saturated polyesters will not exhibit unobviously low shrinkage upon curing. The attached FIGURE provides a quantitative expression of this phenomenon. It is to be observed in the FIGURE that the range of molecular weight of the linear saturated polyester is indeed critical. Specifically, it is to be observed that within the range of 4000 to 6000 the linear shrinkage is not greater than about 20 mils/inch and within the range of 4600 to 5800 the linear shrinkage is not greater than 16 mils/inch. Further, within the range of 4800 to 5500 the linear shrinkage is not greater than about 12 mils/inch and at about 5250 molecular weight the linear shrinkage is reduced to a minimum value in the order of 10 mils/inch. In contrast, beyond the range of 4000 to 6000 the linear shrinkage generally varies between values in the order of about 20 to 24.

In this invention the acid number of the linear saturated polyester is from 10 to 30. If the acid number is below about 10 or above about 30 the surface of articles molded from the unsaturated polyester exhibit a poor surface finish.

The unsaturated polyesters useful in this invention are well known in the art and can be prepared from dicarboxylic acid components and diol components such as described in U.S. Pat. Nos. 3,642,672 and 3,549,586, herein incorporated by reference. Typically, the unsaturated polyester is prepared from a dicarboxylic acid component comprised of an ethylenically unsaturated anhydride containing 2 to 10 carbon atoms, and a diol containing 2 to 10 carbon atoms. In a particularly preferred embodiment of this invention, the dicarboxylic acid component is maleic anhydride and the diol is propylene glycol.

The monomer having at least one olefinic group copolymerizable with the unsaturated polyester is well known in the art and is described in U.S. Pat. Nos. 3,642,672 and 3,549,586, herein incorporated by reference. Styrene is a particularly preferred monomer.

The linear saturated polyester can be in the range of from 8 to 16 weight percent, based on the weight of the composition and preferably is in the range of from 9 to 12 weight percent, based on the weight of the composition.

The unsaturated linear polyester can be admixed with the other materials to form the molding composition by conventional means.

The following examples are presented to illustrate but not limit the invention.

EXAMPLE 1

This example illustrates preparation of the linear saturated polyester of this invention.

Forty three and seven tenths grams of dimethylterephthalate (0.255 mole), 43.7 g. of dimethylisophthalate (0.255 mole), 10.0 g. of 1,4-dimethylcyclohexane dicarboxylate (0.05 mole), 79.6 g. of diethylene glycol (0.75 mole) and 100 ppm. Ti as titanium tetraisopropoxide in butanol were placed in a flask and heated with stirring to 200°C. The ester interchange reaction was rapid and after 2 hr. the temperature was increased to 250°C. The reaction was further heated at this temperature for 2 hours under a stream of nitrogen. A vacuum was then applied to remove excess glycol over a period of ½ hr. and the pressure was further reduced to 0.20 mm. while the reaction was stirred and heated at 250°C. for 2 hours. The viscous polymer was removed from the flask at atmospheric pressure under a stream of nitrogen. One hundred fifty grams of the polyester, having a number average molecular weight of 5,864 was carboxylated with 1.71 grams of trimellitic anhydride by heating the polymer, 1 hr. at 250°C. under a stream of nitrogen to form the linear saturated polyester of the invention having a molecular weight of 5,256 and acid number of 11.2.

EXAMPLE 2

This example illustrates the ability of the linear saturated polyester prepared in Example 1 to reduce the shrinkage and modify the surface appearance of a cured unsaturated polyester.

A first sample illustrating the molding composition of the invention was prepared with the following composition:
  44.5% poly(propylene glycol maleate) unsaturated polyester
  44.5% styrene
  10.0% saturated linear polyester (from Example 1)
  1.0% benzoyl peroxide A second sample was prepared with the same ratio of unsaturated polyester and styrene, but without the saturated linear polyester.

Both the first and second samples were degassed and decanted into the cavity of a precision machined stainless steel mold. Cure was effected by heating the mold in a water bath at 100°C. for 15 min. After cooling to room temperature, the diameter of the thermoset samples were measured with a micrometer and shrinkage was calculated relative to the inside diameter of the mold. The thermoset sample molded from sample one illustrating the molding composition of the invention had low shrinkage and a smooth, glossy surface, while the thermoset sample molded from sample two had high shrinkage and a cracked, rough finish. Table 1 below summarizes the shrinkage and surface characteristics of the thermoset samples molded from samples one and two.

TABLE 1

| Sample No. | Appearance of Thermoset Sample | Linear Shrinkage of Thermoset Sample |
|---|---|---|
| 1 | Opaque, White, No Cracks, Smooth Surface | 10 mils/in. |
| 2 | Transparent, Cracks, Rough Surface | 44 mils/in. |

EXAMPLE 3

This example illustrates the low shrink and desirable surface characteristic of fiberglass reinforced articles molded from the molding composition composed of the linear saturated polyester and an unsaturated polyester resin.

Sheet molding compositions are prepared with the following materials:
- 3 lb. KopLac 3701-25, a poly(propylene glycol maleate) unsaturated polyester resin containing 70% styrene, and commercially available from Koppers Chemical, Inc.
- 2 lb. linear saturated polyester prepared in Example 1 containing 70% styrene
- 7.5 lb. $CaCO_3$
- 0.18 lb. zinc stearate
- 0.05 lb. t-butyl perbenzoate
- 0.24 lb. Modifier-M, a thickening agent commercially available from Marco Resins Div., W. R. Grace Co.
- 5 lb. glass fibers (1 in. length)

The fiber reinforced molded parts exhibit very little shrinkage and exhibited a smooth, uniform surface.

We claim:

1. A polyester consisting essentially of the following structure

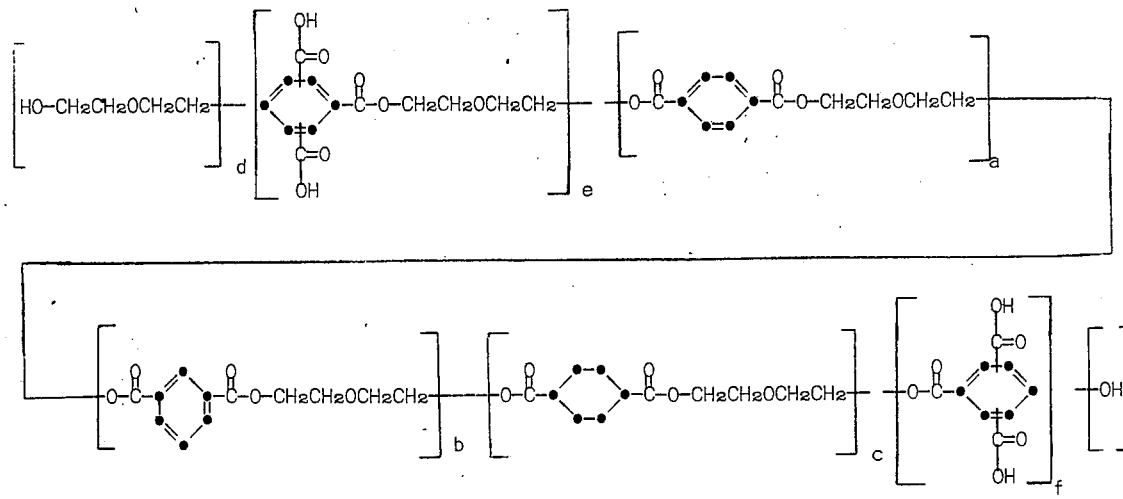

wherein based on the sum of $a$, $b$ and $c$ being 100 moles, $a$ is from 44 to 47 moles, $b$ is from 44 to 47 moles and $c$ is from 6 to 12 moles, $d$ is 0 or 1, $e$ is 0 or 1 and the sum of $d$ and $e = 1$, $f$ is 0 or 1, $g$ is 0 or 1 and the sum of $f$ and $g = 1$, $e$ or $f$ are at least 1, the molecular weight of the polyester is 4000 to 6000, and the acid number of the polyester is 10 to 30.

2. The polyester of claim 1 wherein the molecular weight of the polyester is 4800 to 5500.

* * * * *